United States Patent [19]

Twigg

[11] Patent Number: 4,460,704
[45] Date of Patent: Jul. 17, 1984

[54] CATALYST FOR THE PRODUCTION OF HYDROGEN

[75] Inventor: Martyn V. Twigg, Yarm, England

[73] Assignee: Imperial Chemical Industries PLC, London, England

[21] Appl. No.: 272,466

[22] Filed: Jun. 11, 1981

[30] Foreign Application Priority Data

Jun. 15, 1980 [GB] United Kingdom ............... 8020713

[51] Int. Cl.$^3$ ................. B01J 23/10; B01J 23/74; B01J 35/00
[52] U.S. Cl. .................. 502/302; 502/325; 502/337; 502/527
[58] Field of Search ............ 252/462, 477 R; 423/653, 654; 502/302, 325, 337, 527

[56] References Cited

U.S. PATENT DOCUMENTS

| 3,907,710 | 9/1975 | Lundsager | 252/455 R |
|---|---|---|---|
| 3,915,896 | 10/1975 | Oliver | 252/472 X |
| 4,089,941 | 5/1978 | Villemin | 252/466 J |
| 4,110,256 | 8/1978 | Takeuchi et al. | 252/462 X |
| 4,233,187 | 11/1980 | Atwood et al. | 252/477 R |
| 4,253,992 | 3/1981 | Soejima et al. | 502/527 X |
| 4,337,178 | 6/1982 | Atwood et al. | 502/328 |

FOREIGN PATENT DOCUMENTS

| 2359451 | 7/1974 | Fed. Rep. of Germany . |
|---|---|---|
| 2418403 | 10/1974 | Fed. Rep. of Germany . |
| 2423086 | 12/1974 | Fed. Rep. of Germany . |
| 2454846 | 4/1976 | Fed. Rep. of Germany . |
| 2375138 | 7/1978 | France . |
| 1444946 | 8/1976 | United Kingdom . |
| 1461837 | 1/1977 | United Kingdom . |
| 1474553 | 5/1977 | United Kingdom . |
| 1485640 | 9/1977 | United Kingdom . |
| 1513544 | 6/1978 | United Kingdom . |

OTHER PUBLICATIONS

"Boundary Layer Theory" by H. Schlichting, McGraw-Hill, New York, 7th Edition 1979, pp. 602–604.

Primary Examiner—W. J. Shine
Attorney, Agent, or Firm—Cushman, Darby & Cushman

[57] ABSTRACT

A catalyst for producing hydrogen by reacting in the gaseous phase a hydrocarbon, hydrocarbon derivative or carbon monoxide with steam and/or if appropriate, carbon dioxide is in the form of hollow pieces each having walls 0.5 to 2 mm thick and comprising a primary support of low pore volume and a secondary support of relatively high surface area. The hollow pieces preferably are partitioned rings and are especially useful in hydrocarbon steam reforming because they can afford high catalytic activity at relatively low active metal content, high mechanical strength and low pressure drop.

13 Claims, No Drawings

CATALYST FOR THE PRODUCTION OF HYDROGEN

This invention relates to a catalyst and catalyst process, particularly for the production of hydrogen by gaseous phase reaction of a carbonaceous feedstock with steam or, where appropriate, carbon dioxide.

Catalysts for such processes have most commonly been supported on a refractory material such as alumina or hydraulic cement. They should be mechanically strong to avoid damage during loading of the catalyst bed and during use and should also have a high surface area and porosity for optimum catalytic activity. To minimise the pressure drop across the bed, the catalyst is preferably formed in shaped pieces such as hollow cylinders, and more recently it has been proposed to make such cylinders with relatively thin walls and internal reinforcing partitions, as described in U.S. Pat. Nos. 4,089,941, 4,233,187, U.K. Pat. No. 1,513,544 and French Pat. No. 2,375,138. However, increasing catalyst surface area and porosity decreases mechanical strength and therefore such processes have so far depended on catalysts in which such requirements have been met to a degree based on compromise.

In the present invention a better compromise can be arrived at by deriving mechanical strength from a low pore volume "primary" support and catalytic activity from a coating thereon of a sufficiently high surface area porous "secondary" support. The result is at least one of increased geometric surface and thus catalytic activity, decreased pressure drop and decreased content of active material.

According to the invention a refractory supported catalyst for producing a gas containing hydrogen reacting in the gasous phase a hydrocarbon, hydrocarbon derivative or carbon monoxide with steam and/or, where appropriate, carbon dioxide is in the form of hollow pieces having walls of 0.5 to 3 mm thick and is characterised in that each piece comprises a primary support having a low pore volume and a porous adherent coating, forming a secondary support, having an internal surface area greater then that of the primary support.

The hydrogen producing reactions are:
1.

$$CH_4 + H_2O \rightarrow CO + 3H_2$$

$$\text{"}CH_2\text{"} + H_2O \rightarrow CO + 2H_2$$

("CH$_2$" represents hydrocarbons higher than methane, for example normally gaseous hydrocarbons and normally liquid hydrocarbons boiling at up to 200° C.). The analogous reactions with carbon dioxide $$CH_4 + CO_2 \rightarrow 2CO + 2H_2$$

$$\text{"}CH_2\text{"} + CO_2 \rightarrow 2CO + H_2$$

can be carried out separately or with the steam reaction.

These reactions are strongly endothermic and the process is especially suitable when they are carried out with external heating as in tubular steam reforming. Alternatively the heat can be supplied by heating the reactants and passing steam over the catalyst in an adiabatic bed or in a hydrid process in which oxygen is reactant, so that heat evolved in oxidation is absorbed by the endothermic reactions. The hydrid process can be applied to the product of the tubular or adiabatic process that is, in "secondary reforming", or to the fresh feedstock ("catalytic partial oxidation"). Commonly these reactions are accompanied by the shift reaction.

$$CO + H_2O \rightarrow CO_2 + H_2$$

If the starting hydrocarbon is "CH$_2$" and the temperature is relatively low, the methanation reaction (exothermic) may also occur. However, the process is operated preferably in net endothermic conditions and the hydrogen containing gas produced contains at least 30%$^v$/v of hydrogen on a dry basis. Preferably it contains less than 30, especially less than 10%$^v$/v of methane on a dry basis. For the production of hydrogen-containing synthesis gas, the outlet temperature is preferably at least 600° C. to ensure low methane content. The range 750°–900° C. is of general application for making synthesis gas for ammonia or methanol production. As extremes, the temperature is normally up to 950° C., but possibly up to 1100° C. for the production of metallurgical reducing gas or down to 700° C. for the production of town gas. For the hybrid process using oxygen the temperature may be as high as 1300° C. in the hottest part of the catalyst bed.

For these reactions the catalyst usually comprises metallic nickel and/or cobalt. The pressure is typically in the range 1–50 bar abs. but pressures up to 120 atm abs. are proposed. An excess of steam and/or carbon dioxide is normally used, especially in the range 1.5 to 6, for example 2.5 to 5, mols of steam per atom of carbon in the starting hydrocarbon.

2. Of a hydrocarbon derivative: the most important reaction is methanol decomposition $$CH_3OH \rightarrow CO + 2H_2$$

$$CH_3OH + H_2O \rightarrow CO_2 + 3H_2$$

(or analogously with CO$_2$)

The reaction of ethanol or isobutyraldehyde with steam to produce a hydrogen-containing gas has been proposed for industrial operation. Usually the hydrocarbon derivative is an aliphatic alcohol, ether, ester or amine and its boiling point is not over 200° C. The catalyst is for example zinc oxide/chromium oxide or metallic copper on a support such as zinc oxide with possibly a difficultly reducible oxide, if a gas of low methane content is required and the outlet temperature is to be under 500° C. The reaction may be accomplished by methanation of the carbon oxides and hydrogen, especially when a town gas or substitute natural gas is to be produced, in which an iron oxide/chromium oxide catalyst or a nickel and/or cobalt is used. The formation of methane can, of course, be limited by operating at a high enough temperature and steam excess, as in the hydrocarbon steam reaction.

3. Of carbon monoxide, by the shift reaction:

$$CO + H_2O \rightarrow CO_2 + H_2$$

as a separate operation applied to a starting stream rich in carbon monoxide or to the product of reaction 1 or 2. The temperature is commonly in the range 200°–300° C. over a metallic copper containing catalyst or 300°–450° C. over an iron oxide-chromium oxide catalyst. If sulphur is present in the gas the catalyst can comprise a sulphide of cobalt and/or nickel in combination with a sulphide of molybdenum and/or tungsten and possibly contains also an alkali metal hydroxide or weak acid salt. The steam partial pressure is commonly up to 70 bar but of course below the level of saturation at the operating temperature.

The invention in a second aspect provides the use of such a catalyst in a process of purifying a hydrogen stream of carbon oxides by conversion of such oxides to methane. The carbon content is commonly up to 5, usually under 1.5, %v/v initially. The catalyst is nickel and/or cobalt and/or (less preferably) a platinum group metal. The temperature is typically in the range 300°–450° c. and the pressure the same as for synthesis gas generation.

In general, since the catalyst pieces can have a high geometric surface, the process is especially advantageous in reaction conditions in which the rate is limited by diffusion.

The primary support preferably has a pore volume of less than 0.3 cm$^3$ g$^{-1}$. Where strength is of paramount importance, the pore volume is preferably under 0.18, especially less than 0.1, for example in the range 0.001 to 0.08 cm$^3$ g$^{-1}$. If a catalyst of greater activity than conventional catalyst is required, the pore volume of the primary support is preferably within the range 0.15 to 0.3 cm$^3$ g$^{-1}$.

The pore volume is defined as the difference between the reciprocal of the "mercury" density and the reciprocal of the "helium" density of the samples. These densities, and the surface area, are determined by the following methods which are applied to samples after they have been dried in air at 110° C.

1. Mercury density. The density of the sample immersed in mercury at 20° C. and atmospheric pressure is determined after allowing 15 minutes for the system to equilibrate. This measurement represents the density of the solid containing pores not penetrated by mercury, i.e. pores of radius smaller than about 7.5 × 10$^4$ Angstrom units.
2. Helium density. The density of the sample immersed in helium at room temperature is determined: this represents the density of the ultimate solid material.
3. Surface area. This is determined (after degassing the sample in flowing nitrogen for 40 minutes at 150° C.) by the method of Brunauer, Emmett, and Teller (JACS, 60, 309 (1938)) by measuring the quantity of nitrogen absorbed on the sample at the boiling point of liquid nitrogen: in calculating the surface area, the cross-sectional area of the nitrogen molecule is taken as 16.0 square Angstrom units.

The required low pore volume of the primary support is attained by calcination, for example at a temperature in the range 1300°–1800° C. when alumina is used.

The surface area of the primary support is preferably under 10, especially under 2.0, for example in the range 0.01 to 2.0, especially 0.05 to 1.0 m$^2$ g$^{-1}$.

In the ensuing description, percentage compositions of the catalyst are by weight calculated on the constituents nonvolatile in air at 900° C. of the catalyst precursor in which the catalytic metals are present as monoxides.

The secondary support pore volume is typically over 0.3, especially in the range 0.4–0.8 cm$^3$ g$^{-1}$. Its surface area is preferably in the range 15–300 especially in the range 50–200 m$^2$ g$^{-1}$. When the surface area is over 50 m$^2$ g$^{-1}$ in freshly made catalyst it may decrease during process operation, but not greatly, especially when a grain growth inhibitor is present, as will be described below. The secondary support preferably has a thickness of 0.005 to 1 mm, particularly 0.01 to 0.1 mm. A plurality of coats of the secondary support material may be applied to build up the desired thickness of the secondary support. Typically the secondary support constitutes 0.5 to 30%w/w of the total catalyst.

A very suitable secondary support contains oxide in 2 or more forms, partly derived from a highly dispersed colloidal form and the remainder from a flocculated powder form. The colloidal and flocculated powder oxides can be the same or different: in particular colloidal alumina can be present along with a different alumina or with one or more different oxides. The weight ratio of colloidal material to such other material is suitably in the range 0.05 to 5.0.

The hollow catalyst pieces are sufficiently concave in shape - for example having the cross sectional shape of an "O" or "C" or "U" or "V" - to limit the extent to which one piece can block access of reactant to another piece. Preferably the pieces are hollow cylinders, very suitably having transverse internal partitions. The number of partitions, if projecting radially inwardly of the vessel wall, is preferably at least 3, especially in the range 4 to 7, and is preferably odd. Thus, the number of partitions projecting radially inwardly can preferably be 5 or 7. The partitions can alternatively be chordal; they need not be equally spaced. There can be projections external of the cylinder walls, instead of or in addition to the internal partitions.

In a preferred class of shapes the passages are defined by partitions having a chordal cross section, preferably nonradial. This class includes hollow cylinders having as cross section a circle having at least one inscribed polygon having up to 6 sides, for example a square or equilateral triangle or 2 equilateral triangles in symmetrical superimposition. In another preferred class of hollow cylinders the passages are defined by partitions having the cross section of chords intersecting one another in pairs at points distanced from the circumference and centre of the circle in a plane perpendicular to the axis of the cylinder.

In the latter class the number of chords is preferably up to 8 and preferably they are equal in length, so that they define a regular polygon having the same centre as the circle. Very suitably there are 3, 4 or 5 chords. The resulting cross section includes area of three different types:

(a) bounded by part-chords only, thus forming the central polygon;
(b) bounded by three part-chords and one arc, along the sides of the polygon; and
(c) bounded by two part-chords and one arc, at the corners of the polygon.

When the type (c) areas are smaller than the type (b) areas, they can be closed, in order to make it easier to manufacture the shapes. When the type (a) or (b) areas are small, however, there appears to be no advantage in closing them. Preferably the areas of the (a) and (b) types do not differ by more than 50%.

The geometric surface of the shapes is typically at least 400 m$^2$ per m$^3$.

Especially when the process is to be operated with heat exchange during chemical reaction, as in the externally heated steam hydrocarbon reaction, the hollow cylinders have at least one channel forming face. The depth of the channels made available by the channel forming face should be at least equal to the depth of the laminar sublayer of fluid that will be present during operation of the process for which the contact material is to be used. (The laminar sublayer is defined in "Boundary Layer Theory" by H. Schlichting, McGraw-Hill, New York, 7th edition 1979, pages 602-604). The depth of the laminar sublayer depends on temperature, pressure, fluid composition and fluid flow rate and thus in principle minimum channel depth could be prescribed for each set of conditions. For a wide range of applicability, however, a shape having at least one surface that chordally in contact with a cylindrical surface of 50 mm radius defines a channel cross section of greater area than the corresponding straight chord, can be used. Such a face preferably is generally flat in at least one dimension but formed with at least one projection of a height in the range 0.3 to 3.0 mm, especially 0.8 to 2.0 mm, and positioned so as to extend beyond an arc of 50 mm radius.

As examples of channel forming faces there may be mentioned:

(a) end faces protrusioned, grooved or stepped;
(b) when the hollow cylinder has more than one through passage, one or more projections formed on one or more of the walls separating the passages;
(c) circumferential wall formed with one or more flanges.

The catalyst pieces preferably are small compared with the dimensions of the catalyst bed to be charged therewith. (By "small" we mean having at least one dimension less then 0.25, especially less than 0.15, of the catalyst bed average width). For a wide range of processes they are typically 5–50 mm in outer diameter and height. For the hydrocarbon steam reaction in externally heated tubes of up to 150 mm diameter, these dimensions are respectively 10–20 and 6–12 mm. Correspondingly larger pieces can be used in wider tubes, such as are employed in specialised forms of the process. The thickness of the walls of the hollow pieces, whether external or internal is preferably in the range 1–2 mm.

The primary support is any suitable refractory material and is preferably alumina, particularly alpha-alumina, alumino-silicate, magnesia-alumina spinel, calcium aluminate cement, cordierite, zirconia, titania, or combinations thereof. If the primary support is mainly alumina, it can contain over 2, e.g. up to 30% w/w, of oxides other than alumina.

The secondary support can comprise any oxidic material known as a support for a catalyst for the reaction to be carried out. Typically it comprises alumina, particularly gamma - or eta-alumins, and this is especially preferred when the primary support is or contains alumina, particularly alpha-alumina. Other sesquioxides, for example, chromia and rare earth oxides may make up at least part of the secondary support. Other useful secondary support oxides are titania, zirconia, hafnia, thoria, vanadia, urania and oxides of manganese, molybdenum and tungsten.

Preferably the secondary support includes a grain growth inhibitor, for example at least 0.05, especially 0.1 to 5.0%, by weight of one or more rare earth oxides, especially of cerium, yttrium, or praseodymium.

When nickel and/or cobalt are present in the catalyst, it is expected that the secondary support, if it contains a sesquioxide, will include, at least after a period of process operation, some nickel and/or cobalt spinel. It is within the invention to have the secondary support material at least partly in the form of spinel, whether of nickel and/or cobalt or of a divalent metal having a difficultly reducible oxide, especially magnesium or manganese or, less preferably, zinc. Since nickel and/or cobalt present as spinel is in a reduction-resistant oxidic form, it does not contribute significantly to the activity of the catalyst: active nickel and/or cobalt are additional thereto.

When the catalytic metal is to be copper, the secondary support preferably includes zinc oxide and preferably also one or more of boria, alumina, chromia, rare earth oxides, vanadia and manganese oxide.

In a catalyst comprising nickel and/or cobalt there may also be present one or more platinum group metals, which are capable of increasing the activity of the nickel and/or cobalt and of decreasing the tendency to carbon lay-down when reacting steam with hydrocarbons higher than methane. Further, the catalyst, especially in preferred forms, can contain a platinum group metal but no non-noble catalytic component. Such a catalyst is more suitable for the steam/hydrocarbon reaction than one containing a platinum group metal on a conventional support because a greater fraction of the active metal is accessible to the reacting gas.

For the hydrocarbon steam reaction the catalyst contains (calculated as monoxide) typically 0.2 to 35, especially 1 to 25% w/w of nickel and/or cobalt. Within this range 0.5 to 8.0, especially 1 to 6 or even 1 to 4% w/w is preferred. This is generally less than has been proposed for catalysts of this type in which only one type of alumina support is present.

The specific surface of the catalytic metal is suitably in the range 0.1 to 50 m²/g of catalyst. Within these ranges the larger areas are preferred for reactions under 600° C.

The catalyst can be made by applying a compound of the active metal and the secondary support together to the primary support. In a preferred method the secondary support is applied to the primary support, the combination is preferably calcined, and then a solution containing a thermally decomposable compound of active metal is applied. In order to obtain a large enough content of active metal, several applications of such a solution, each followed by drying and thermal decomposition, may be made. Oxides can be produced in situ in the secondary support by oxidation of powdered metal or thermal decomposition of an oxy salt such as a nitrate. Other methods, such as deposition from the vapour phase can be used.

A preferred method of making the catalyst comprises forming a colloidal dispersion of the secondary support material, for example by acid-peptisation and preferably also de-ionisation, suspending further support material in the dispersion, applying the suspension to the primary support and calcining it to effect adhesion and adjust the surface area of the secondary support. Any grain growth inhibitor is preferably added with the dispersion or suspension. The suspension can be caused to gel before calcination. It may, if desired, contain a soluble surfactant or polymer.

The method involving thermal decomposition of an oxy salt has also given excellent results and is especially preferred when a grain growth inhibiting oxide is to be present, apparently because the secondary support oxide and inhibiting oxide are deposited together.

To improve adhesion of the secondary support to the primary support the external surface of the primary support can be modified to increase its adsorptive area before applying the secondary support. Ways of doing this include the following:

(a) mechanical abrasion, for example by rolling in abrasive powder;
(b) etching by a liquid, for example alkali, ammonia, amines, strong acid, complex-forming acid (such as HF, citric acid, other hydroxy or polybasic acids), chelating agent (such as EDTA salt or acetylacetone);
(c) etching by a gas, for example a carrier gas containing a volatile base or acid.

If desired two or all three ways can be used together. It appears that whereas such treatments may remove material from the surface, it suffices if they render the surface hydrated or hydratable.

To demonstrate this, two primary supports were pretreated and then coated with one or both of two alumina dispersions. The first dispersion contained 27 g böhmite (average particle size 2.5 microns) and 0.2 g mixed rare earth oxides (50% CeO$_2$) in 100 ml of water. The coated support was drained, dried and calcined at 1000° C. for 6 hours. By X-ray diffraction the coating was shown to consist of delta and theta alumina. This operation was than repeated but using a more concentrated coating mixture made by dispersing 10g of pseudoböhmite in 100 ml of 0.2% nitric acid and suspending 100 g of the böhmite therein. The major alumina phase present was alpha. For some samples only the second mixture was used. In each run the pretreatment consisted in dipping in an acid or alkaline solution at 50° C. for 20 minutes and drying at 130° C. for 0.5 h.

The substrates used were:
A: ceramic rings with internal partitions.
B: alpha alumina open rings.
The gains in weight are shown in Table 1.

TABLE 1

| Substrate | Treatment | Gain in weight % w/w | |
|---|---|---|---|
| | | First coating | Second coating |
| A | None | 3.0 | 15.8 |
| | | not used | 10.9 |
| | aq. NH$_3$ | 3.9 | 17.5 |
| | | not used | 10.3 |
| | conc. HNO$_3$ | 4.3 | 12.3 |
| | | not used | 10.7 |
| B | None | 0.2 | 7.7 |
| | aq. NH$_3$ | 0.3 | 10.4 |

The coatings on the pre-treated primary supports showed especially good adhesion and uniformity.

EXAMPLE 1

(a) The primary support was fired aluminosilicate extruded rings of 8 mm outside diameter, 1 mm wall thickness and 8 mm height, having properties as follows:

| Surface area | 0.1 m$^2$ g$^{-1}$ |
|---|---|
| Helium density | 2.51 g cm$^{-3}$ |
| Mercury density | 2.49 g cm$^{-3}$ |
| Pore volume | 0.004 cm$^3$ g$^{-1}$ |

The coating material for the secondary support was prepared as follows

Alumina hydrate (600 g) was added to dilute nitric acid (2200 ml of 0.14 M acid) and stirred vigorously for 4 hours at room temperature. The resulting sol was deionised by dialysis through the walls of a cellulose acetate container surrounded by deionised water. To a 150 ml sample of deionised sol was added 300 g of the same alumina. This was followed by 10 ml of non-ionic wetting agent and 2.25 g of cerium nitrate in 10 ml of water, and then water was stirred in to bring the total volume to 1.2 liters, corresponding to about 30% of Al$_2$O$_3$.

500 g of the primary support rings were given two coats of the coating mixture, each coat being applied by allowing the rings to stand in the coating mixture for 20 minutes followed by draining and drying at 55° C. The coated rings were calcined for 1 hour at 700° C. after each coat.

The weight of the calcined secondary support was 0.6% of the combined primary and secondary supports. The secondary support had a surface area of about 150 m$^2$ g$^{-1}$.

The rings bearing the calcined secondary support were then dipped into an aqueous solution of nickel nitrate (1000 g l$^{-1}$ of Ni(NO$_3$)$_2$. 6H$_2$O) for 5 minutes, drained, dried at 120° C. and calcined for 7 hours at 450° C. This procedure was repeated to give a catalyst precursor A having a nickel content (expressed as NiO) of 0.7% by weight.

A 500 ml charge of it was placed in a 250 mm long 50 mm internal diameter tube equipped for external electric heating. A preheated (400° C.) mixture of desulphurised natural gas (vol % 91 CH$_4$, 3.5 C$_2$H$_6$, 2N$_2$) and steam (ratio 1:3) was passed through at a volume space velocity of 2000 h$^{-1}$, atmospheric pressure. The catalyst temperature was adjusted to successive levels between 500° and 700° C. Although the catalyst precursor was not reduced before feeding methane and steam to it, its activity developed rapidly.

The methane contents of the exit gas are shown in Table 2.

(b) Example 1a was repeated but the coating of the secondary support material was omitted. Thus the primary support was impregnated (twice) directly with the nickel nitrate solution. The nickel content, expressed as NiO, of the catalyst precursor, B, was 0.8% by weight.

TABLE 2

| Catalyst Precursor | Methane content of exit gas (% v/v) at bed exit temperatures of | | | |
|---|---|---|---|---|
| | 500° C. | 600° C. | 650° C. | 700° C. |
| A | 19.3 | 7.7 | 5.0 | — |
| B+ | 28.3 | 33.0 | — | 29.0 |

+ comparative

EXAMPLE 2

The primary support, made by dry compression pelleting of alpha alumina, followed by calcination at 1650° C., had these properties:

| Cylinder height, mm | 8 |
|---|---|
| outer diameter | 15 |
| wall thickness | 2 |
| inner structure | 7 radial spokes 1 mm thick. |
| Surface area | 0.1 m$^2$ g$^{-1}$ |
| Helium density | 3.94 g cm$^{-3}$ |
| Mercury density | 3.34 g cm$^{-3}$ |
| Pore volume | 0.05 cm$^3$ g$^{-1}$ |

The coating mixture for the secondary support was prepared from a dispersible alumina hydrate ("Cerasol"-RTM) having these properties:

| Composition % | Al$_2$O$_3$ | 65 |
| --- | --- | --- |
| | H$_2$O | 35 |
| | Na$_2$O | 0.02 |
| | SiO$_2$ | 0.01 |
| | Fe$_2$O$_3$ | 0.02 |
| Crystallite size | about 70 Angstrom units | |
| Crystal structure | bohmite | |
| Helium density | 2.78 g ml$^{-1}$ | |
| Hg density | 1.56 g ml$^-$ | |
| pore volume | 0.28 ml g$^{-1}$ | |

This alumina hydrate (150 g) was stirred vigorously with 1100 g of water for 4 hours at room temperature. To the resulting sol was added 300 g of the same alumina, followed by 5 ml of non-ionic wetting agent and 9.7 g cerium nitrate in 50 ml of water, and then the mixture was stirred for 2 hours.

A sample (757 g) of primary support was immersed in this suspension for 20 minutes allowed to drain, dried at 50° C. and calcined at 1000° C. for 1 hour. The coated support then carried 0.63% of alumina. To obtain a thicker coating this operation was repeated twice, giving 3.2% of alumina. The secondary support alumina had a surface area 100 m$^2$ g$^{-1}$ and a pore volume substantially greater than before calcination.

A sample of coated support was immersed for 20 minutes in a nickel nitrate solution containing 20 g of nickel (as metal) per 100 ml, allowed to drain for 30 minutes, dried for 2 hours at 120° C. and calcined at 450° C. for 4 hours. This procedure was repeated twice. The resulting precursor contained 4.4% nickel oxide NiO, and had a mean horizontal crushing strength of 125 kg (range 95–175).

The catalyst precursor was tested for activity as described in Example 1, steamed for 16 hours at 760° C., then tested again. A comparison catalyst of the same general shape but differing in the following properties was tested in the same way:

| Dimensions, mm: height | 9.0 |
| --- | --- |
| outer diameter | 16.8 mm |
| wall thickness | 2.0 mm |
| inner structure | 1.5 mm |
| Secondary support: | none |
| Surface area | 1.7 m$^2$ g$^{-1}$ |
| Helium density | 4.04 g cm$^{-3}$ |
| Mercury density | 2.51 g cm$^{-3}$ |
| Pore volume | 0.15 cm$^3$ g$^{-1}$ |
| NiO content | 10.0% w/w |
| Mean horizontal crushing strength 36 kg (range 20–50). | |

(The support was in fact the primary support of the invention catalyst, but before calcination at 1650° C.).

The results are shown in Table 3

TABLE 3

| Temperature | Outlet methane % v/v on dry basis | | | |
| --- | --- | --- | --- | --- |
| | Invention | | Comparison | |
| °C. | initial | steamed | initial | steamed |
| 550 | 25.3 | 23.7 | 20.2 | ca 90 |
| 600 | 15.9 | 13.4 | 9.4 | ca 90 |
| 650 | 8.3 | 7.4 | 5.4 (665° C.) | ca 90 |
| 700 | 4.2 | 3.9 | 2.1 (710° C.) | 1.4 |
| 760 | 2.2 | 1.5 | 1.0 | 1.0 |

It is evident that the new catalyst is only slightly less active than the comparison, despite its much lower nickel content, and has much more stable low temperature activity.

Similar results were obtained using a catalyst made from a dispersion containing a soluble hydroxyethyl cellulose instead of the wetting agent.

EXAMPLE 3

(a) A primary support (500 g) similar to that of Example 2 but having a surface area of 0.3 m$^2$g$^{-1}$ and pore volume 0.06 cm$^3$g$^{-1}$ was coated with secondary support by dipping for 10 minutes in a solution of aluminium nitrate nonahydrate (375 g), cerium nitrate hexahydrate (0.5 g) and water (10 g) at 85°–90° C. The support was then drained, dried overnight at 50° C. and calcined at 1000° C. for 1 hour. This procedure was repeated once and the resulting secondary support content was 3% W/W. It was impregnated with nickel nitrate solution (20 g Ni per 100 ml), drained, dried at 120° C. and calcined at 450° C. for 6 hours. This procedure was repeated, giving a nickel content of 2.1% ad NiO.

(b) The operations of paragraph (a) were repeated subject to the change that 3 coatings of alumina/ceria were made, the second and third being calcined at 800° C. for 1 hour. The secondary support content was 3.3% W/W and the NiO content 3.5%.

(c) A sample of the coating solution was dried and then calcined at 800° C. for 1 hour. The resulting oxide mixture had these properties:

| Crystallography: | gamma + eta alumina |
| --- | --- |
| Surface area | 122 m$^2$ g$^{-1}$ |
| Helium density | 2.96 g cm$^{-3}$ |
| Mercury density | 1.18 g cm$^{-3}$ |
| Pore volume | 0.52 cm$^3$ g$^{-1}$ |

The above catalyst precursors were tested as described in Example 1 and the results are shown in Table 4.

TABLE 4

| Temperature | Outlet methane content % v/v on dry basis | | | |
| --- | --- | --- | --- | --- |
| | a | | b | |
| °C. | initial | steamed | initial | steamed |
| 500 | 25.3 | NA | 26.2 | NA |
| 550 | 20.2 | NA | 21.8 | NA |
| 600 | 8.7 | NA | 12.4 | 12.8 |
| 650 | NA | 10.5 | 7.1 | 8.0 |
| 700 | 3.5 | 5.9 | 6.5 | 5.8 |
| 760 | 1.9 | 2.9 | 2.4 | 2.1 |

It is evident that the activity and stability of the catalyst are about the same as for that of the preceding Example.

EXAMPLE 4

Example 2 was repeated using a primary support of generally similar over-all dimensions, composition and micromeritics, but having as its inner structure a set of partitions having the cross-section of two pairs of mutually parallel chords, each pair perpendicular to the other pair. These chords defined a central square of 2.6 mm side. Three alumina applications were made, giving 4.6% w/w of secondary support. Three nickel nitrate applications were made, giving an Ni content of 5.2%.

The resulting catalyst had a geometric surface area of 600 m$^2$cm$^{-3}$, which is more than double the value (284) for conventional steam reforming catalyst rings, yet exerted a pressure drop 5% less than that of conventional catalyst in the form of rings 17 mm outer diameter, 17 mm high, with a single hole 7 mm in diameter.

It was tested by the method described in Example 1 at 600° C. and above and found to give the following percentage conversion of methane:

| temperature °C. | 600 | 650 | 700 | 760 |
|---|---|---|---|---|
| initial | 88 | 92 | 97 | 98 |
| after 16 hours steaming at 760° C. | 84 | 90 | 96 | 97 |

After 100 hours reaction at 760° C. the activity was unchanged.

In a further test, in a 100 mm internal diameter reformer tube at 700° C. outlet temperature, 11 bar abs pressure and steam ratio 4.2 the outlet methane content averaged 2.5% $v/v$ over 45 days, as compared with 3.8% using the conventional catalyst, despite a 5% greater flow rate through the invention catalyst.

I claim:

1. A catalyst for producing a gas containing hydrogen by reacting in the gaseous phase a hydrocarbon, hydrocarbon derivative or carbon monoxide with steam and/or, where appropriate, carbon dioxide, in the form of hollow cylinders having walls 0.5 to 3 mm thick, each said cylinder comprising a primary support made of refractory material having a pore volume less than 0.3 $cm^3g^{-1}$ and a surface area less than 10 $m^2g^{-1}$ and a coating thereon of a secondary support made of refractory oxidic material having a pore volume greater than 0.3 $cm^3g^{-1}$ and an internal surface area in the range 15–300 $m^2g^{-1}$, said secondary support having deposited thereon a catalyst comprising nickel and/or cobalt.

2. A catalyst according to claim 1 in which the pore volume of the primary support is less than 0.18 $cm^3g^{-1}$.

3. A catalyst according to claim 1 in which the surface area of the primary support is in the range 0.01 to 2.0 $m^2g^{-1}$.

4. A catalyst according to claim 1, 2 or 3 in which the surface area of the secondary support is in the range 50 to 200 $m^2g^{-1}$.

5. A catalyst according to claim 1 in the form of hollow cylinders having 5 or 7 inwardly projecting radial partitions.

6. A catalyst according to claim 1 in the form of hollow cylinders having through passages defined by partitions having the cross-section of chords intersecting one another in pairs at points distanced from the circumference and centre of the circle in a plane perpendicular to the cylinder axis.

7. A catalyst according to claim 1 in which the secondary support comprises 0.1 to 5.0% $W/W$ of an oxide of a rare earth metal.

8. A catalyst according to claim 1 and intended for a process starting from a hydrocarbon, in which the nickel and/or cobalt is present to the extent of 1 to 6% $W/W$ calculated as monoxide.

9. A catalyst as in claim 1 wherein the nickel and/or cobalt content in within the range 0.2 to 35% $W/W$ calculated as monoxide.

10. A catalyst as in claim 1 wherein the nickel and/or cobalt content is within the range 1 to 25% $W/W$ calculated as monoxide.

11. A catalyst as in claim 1 wherein the nickel and/or cobalt content is within the range 0.5 to 8.0% $W/W$ calculated as monoxide.

12. A catalyst as in claim 1 wherein the nickel and/or cobalt content is within the range 1 to 6% $W/W$ calculated as monoxide.

13. A catalyst as in claim 1 wherein the nickel and/or cobalt content is within the range 1 to 4% $W/W$ calculated as monoxide.

* * * * *